(12) United States Patent
V K Chacko et al.

(10) Patent No.: US 11,165,494 B2
(45) Date of Patent: Nov. 2, 2021

(54) FULL DUPLEX OPERATION OF A PORTABLE COMMUNICATIONS DEVICE IN A TIME DIVISION MULTIPLE ACCESS RADIO SYSTEM

(71) Applicant: MOTOROLA SOLUTIONS, INC., Chicago, IL (US)

(72) Inventors: V. C. Prakash V K Chacko, Penang (MY); Yi Lynn Kok, Penang (MY); Wai Mun Lee, Perak (MY); Siew Im Low, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/821,765

(22) Filed: Mar. 17, 2020

(65) Prior Publication Data

US 2021/0297150 A1    Sep. 23, 2021

(51) Int. Cl.
*H04W 4/00*    (2018.01)
*H04B 7/26*    (2006.01)
(Continued)

(52) U.S. Cl.
CPC .............. *H04B 7/265* (2013.01); *H04B 1/44* (2013.01); *H04L 5/143* (2013.01); *H04W 72/0446* (2013.01); *H04W 84/08* (2013.01)

(58) Field of Classification Search
CPC ..... H04B 7/265; H04B 1/44; H04W 72/0446; H04W 48/08
See application file for complete search history.

(56) References Cited

U.S. PATENT DOCUMENTS 6,480,553 B1    11/2002  Ho et al.
7,027,796 B1    4/2006   Linsky et al.
(Continued)

FOREIGN PATENT DOCUMENTS

EP    2775626 A1    9/2014

OTHER PUBLICATIONS

European Telecommunication Standards Institute (ESTI), "Terrestrial Trunked Radio (TETRA) Voice plus Data (V+D) Designer' Guide, Part 3: Direct Mode Operations" ETR 300.3 Feb. 2000.
(Continued)

*Primary Examiner* — Abdelnabi O Musa
(74) *Attorney, Agent, or Firm* — Michael Best & Friedrich LLP

(57) ABSTRACT

Portable communications device and method for full duplex operation in a time division multiple access radio system. The method includes providing a switch for connecting one of a first voltage controlled oscillator and a second voltage controlled oscillator to a synthesizer. The synthesizer generates a first frequency when connected to the first voltage controlled oscillator and generates a second frequency when connected to the second voltage controlled oscillator. The method also includes controlling, using an electronic processor coupled to the switch, the switch to connect the first voltage controlled oscillator to the synthesizer for a first timeslot, and controlling, using the electronic processor, the switch to disconnect the first voltage controlled oscillator from the synthesizer and connect the second voltage controlled oscillator to the synthesizer for a second timeslot. The second timeslot is immediately adjacent to the first timeslot.

18 Claims, 4 Drawing Sheets

(51) Int. Cl.
  *H04L 5/14* (2006.01)
  *H04B 1/44* (2006.01)
  *H04W 72/04* (2009.01)
  *H04W 84/08* (2009.01)

(56) References Cited

U.S. PATENT DOCUMENTS

| | | | |
|---|---|---|---|
| 9,232,522 B2 | 1/2016 | Khoo et al. | |
| 2002/0024364 A1* | 2/2002 | Aoki | H03B 21/02 327/105 |
| 2005/0048932 A1* | 3/2005 | Balasubramaniyan | H04B 1/406 455/93 |
| 2006/0262741 A1* | 11/2006 | Niemela | H04B 7/12 370/319 |
| 2009/0275357 A1* | 11/2009 | Nakamura | H04B 1/406 455/550.1 |
| 2011/0298503 A1 | 12/2011 | Obkircher et al. | |
| 2012/0081155 A1* | 4/2012 | Li | H03B 5/1265 327/105 |
| 2013/0156134 A1* | 6/2013 | Galan | H04B 1/0007 375/340 |
| 2013/0176913 A1* | 7/2013 | Niskanen | H04L 5/14 370/278 |
| 2013/0229954 A1* | 9/2013 | Narathong | H04B 1/408 370/280 |
| 2015/0349711 A1 | 12/2015 | Han et al. | |
| 2015/0372710 A1* | 12/2015 | Longhurst | H04B 1/44 455/78 |

OTHER PUBLICATIONS

International Search Report and Written Opinion for Application No. PCT/US2021/018712 dated Jun. 15, 2021 (14 pages).

* cited by examiner

FULL DUPLEX OPERATION OF A PORTABLE COMMUNICATIONS DEVICE IN A TIME DIVISION MULTIPLE ACCESS RADIO SYSTEM

BACKGROUND OF THE INVENTION

Members of public safety organizations (for example, police departments, fire departments, emergency medical services, and the like) use portable communications devices (for example, two-way radios, smart telephones, and the like) for communication over a private or public communication network. In some cases, communications take place over a digital mobile radio (DMR) network, a project 25 (P25) network, or the like. In addition, some communication networks use time division multiple access (TDMA) method for enabling communication between the portable communications devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
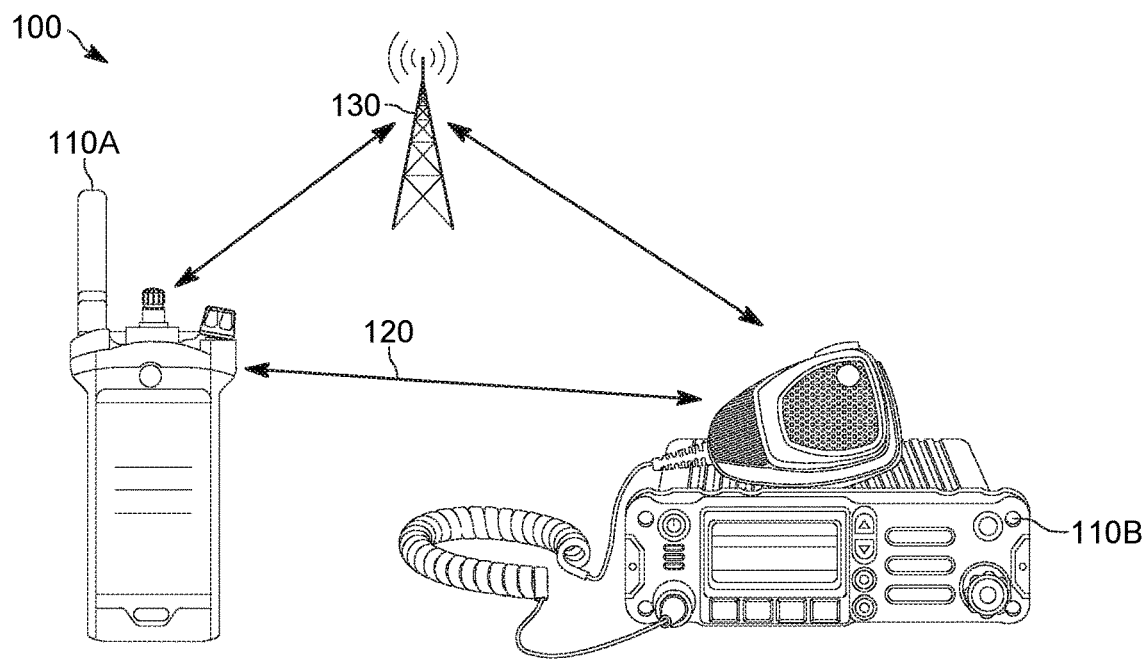
FIG. 1 is a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

TDMA is a channel access method that allows multiple portable communications devices to share the same frequency channel by dividing the channel into multiple timeslots. For example, the DMR standard divides each frequency channel into two timeslots that can be used to accommodate two calls within the same frequency channel.

Many portable communications devices currently use half-duplex communication (also referred to as simplex communication) over the communication network. That is, the portable communications devices have to wait for the transmitting device to finish transmission before the receiving device can transmit.

Current trends are moving towards using full-duplex communication for portable communications devices. Some existing methods of implementing full-duplex communication include providing multiple synthesizers in the portable communications devices. The multiple synthesizers operate simultaneously on different frequencies such that a first frequency is used for transmission while a second frequency is used for reception. However, each additional synthesizer adds to the cost of the portable communications device. Additional synthesizers and the method for operating the synthesizers also add to the complexity of the portable communications device.

Accordingly, there is a need for, among other things, a simple, low cost portable communications devices that are capable of full duplex operation in a TDMA radio system.

One embodiment provides a portable communications device for full duplex operation in a time division multiple access (TDMA) radio system. The portable communications device includes a first voltage controlled oscillator, a second voltage controlled oscillator, and a synthesizer configured to generate a first frequency when connected to the first voltage controlled oscillator and generate a second frequency when connected to the second voltage controlled oscillator. The portable communications device also includes a switch coupled to the first voltage controlled oscillator, the second voltage controlled oscillator, and the synthesizer. The switch is configured to connect one of the first voltage controlled oscillator and the second voltage controlled oscillator to the synthesizer. The portable communications device further includes an electronic processor coupled to the first voltage controlled oscillator, the second voltage controlled oscillator, and the switch. The electronic processor is configured to control the switch to connect the first voltage controlled oscillator to the synthesizer for a first timeslot, and control the switch to disconnect the first voltage controlled oscillator from the synthesizer and connect the second voltage controlled oscillator to the synthesizer for a second timeslot. The second timeslot is immediately adjacent to the first timeslot.

Another embodiment provides a method for full duplex operation of a portable communications device in a time division multiple access (TDMA) radio system. The method includes providing a switch for connecting one of a first voltage controlled oscillator and a second voltage controlled oscillator to a synthesizer. The synthesizer generates a first frequency when connected to the first voltage controlled oscillator and generates a second frequency when connected to the second voltage controlled oscillator. The method also includes controlling, using an electronic processor coupled to the switch, the switch to connect the first voltage controlled oscillator to the synthesizer for a first timeslot, and controlling, using the electronic processor, the switch to disconnect the first voltage controlled oscillator from the synthesizer and connect the second voltage controlled oscillator to the synthesizer for a second timeslot. The second timeslot is immediately adjacent to the first timeslot.

FIG. 1 illustrates an example communication system 100 implemented by a public safety organization (for example, a police department, a fire department, and the like). The communication system 100 is, for example, a digital mobile radio (DMR) system, a Project 25 (P25) system, and the like. In the example shown, the communication system 100 includes a plurality of portable communications devices 110 that may communicate in a direct mode via a direct connection 120, or over back-end infrastructure 130 of the communication system 100. The plurality of portable communications devices 110 include a first portable communications device 110A and a second portable communications device 110B. The plurality of portable communications devices 110 are singularly referred to as a portable communications device 110. The example in FIG. 1 is illustrated with two portable communications devices 110. However, the communication system 100 may include a larger number of portable communications devices 110 operating over the communication system 100.

The portable communications device 110 is, for example, a portable two-way radio, a mobile two-way radio, a smart telephone, a smart watch, a tablet computer, a laptop computer, and the like. The back-end infrastructure 130 includes, for example, a base station, a repeater, and/or the like. When the first portable communications device 110A is communicating with the second portable communications device 110B over the back-end infrastructure 130, radio frequency (RF) signals from the first portable communications device 110A are first sent to the back-end infrastructure 130 and then forwarded to the second portable communications device 110B. In contrast, in a direct mode of communication, RF signals from the first portable communications device 110A are sent directly to the second portable communications device 110B.

Figure 2A:
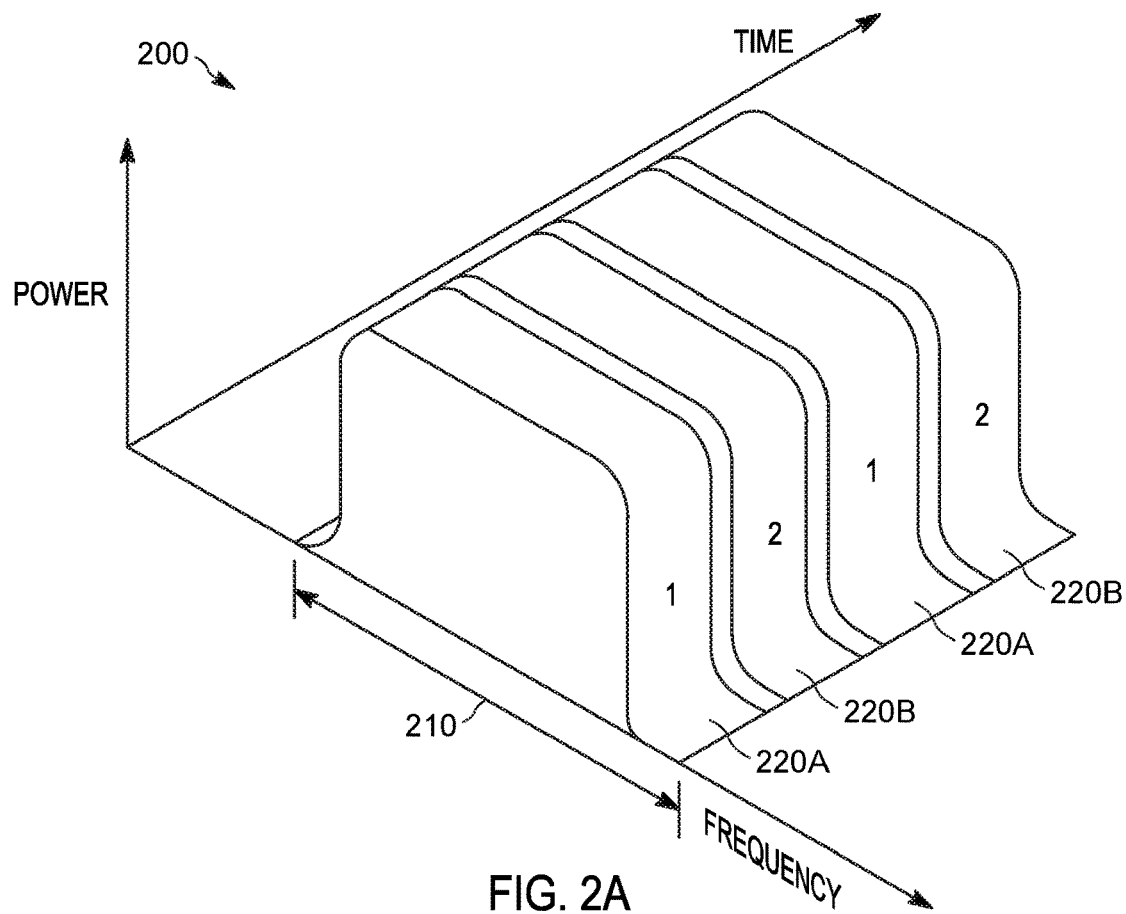
FIGS. 2A and 2B illustrate a time-division multiple access channel access method implemented by the communication system of FIG. 1 in accordance with some embodiments.
Figure 2B:
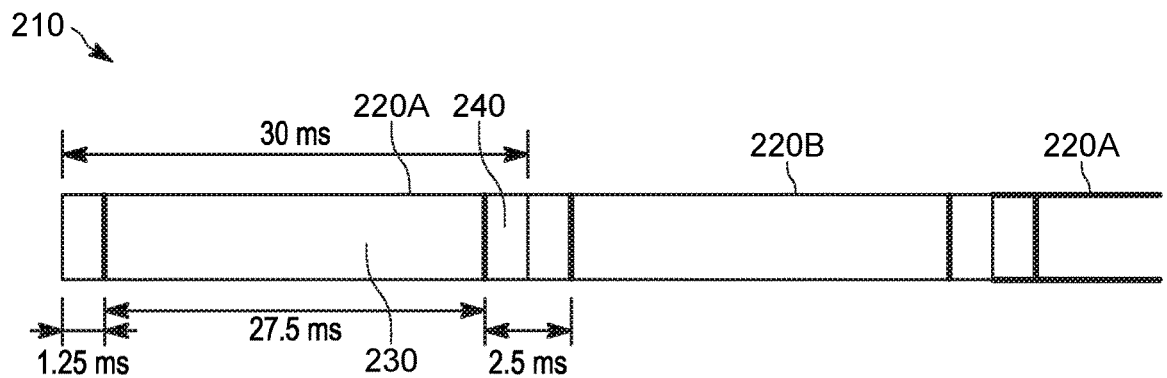

The communication system 100 may implement a time-division multiple access (TDMA) channel access method. FIGS. 2A and 2B illustrate an example TDMA channel access method 200 implemented by the communication system 100. The TDMA method 200 includes dividing a channel bandwidth 210 into two timeslots 220: a first timeslot 220A and a second timeslot 220B. Referring to the example in FIG. 2B, each timeslot 220 is 30 milliseconds (ms) long and includes a payload period 230 that is 27.5 ms long and a guard interval 240 that is 2.5 ms long. The guard interval 240 is divided between the front and back end of the timeslots 220 such that the payload period 230 is sandwiched between two 1.25 ms guard intervals 240. In the present disclosure, the communication system 100 is explained with respect to an example having two timeslots 220. For example, the DMR system and the P25 systems divide respective frequency channels into two timeslots 220. However, the communication system 100 may work with other RF communication methods, for example, TETRA, a long term evolution (LTE), and the like that may divide each frequency channel into more than two timeslots 220.

The two timeslots 220 are allotted to different calls such that two calls may operate simultaneously on a single channel bandwidth 210. A call as used herein refers to communication between two portable communications devices 110 or between a portable communications device 110 and the back-end infrastructure 130. Typically, the TDMA method 200 is implemented over an allotted band for the public safety organization, for example, an ultra-high frequency (UHF) band of between 400-527 MegaHertz (MHz). Each channel has a bandwidth of, for example, 12.5 KiloHertz (KHz), such that each band is divided into a plurality of channels. As a consequence, each band can facilitate a plurality of calls over difference channels with each channel facilitating one or more calls.

In a half duplex communication method, a direct mode call between the first portable communications device 110A and the second portable communications device 110B is assigned, for example, the first timeslot 220A on a first frequency (that is a first bandwidth of the UHF band). The first portable communications device 110A and the second portable communications device 110B use the first frequency for the remainder of the call and communicate over the first timeslot 220A. In the half duplex method, each timeslot 220 can only be used for one way communication between the first portable communications device 110A and the second portable communications device 110B. As a consequence, the second portable communications device 110B waits for transmission from the first portable communications device 110A to end before the second portable communications device 110B can transmit a message to the first portable communications device 110A.

Figure 4:
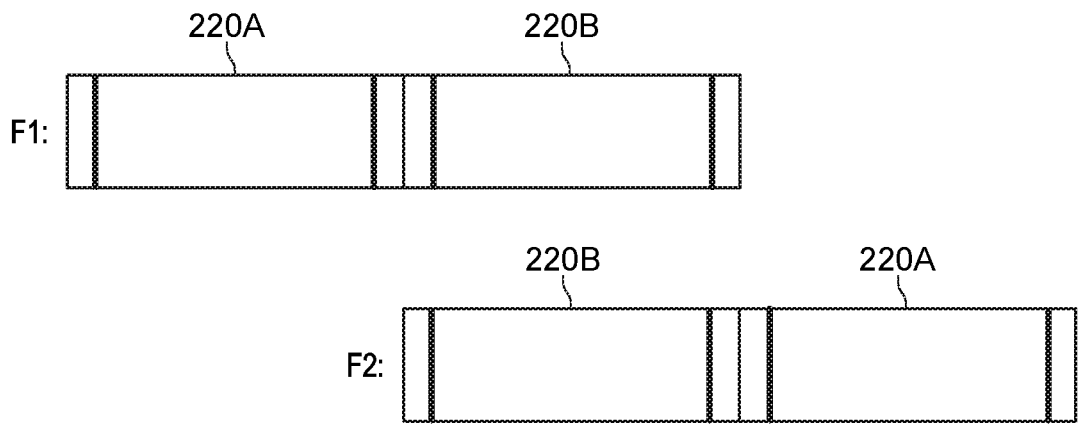
FIG. 4 is an example full duplex communication implemented in the communication system of FIG. 1 in accordance with some embodiments.

In a full duplex communication method, a direct mode call between the first portable communications device 110A and the second portable communications device 110B is assigned, for example, a first timeslot 220A on a first frequency and a second timeslot 220B on a second frequency (as shown in FIG. 4). In the full duplex communication method, the first portable communications device 110A can transmit messages to the second portable communications device 110B over the first timeslot 220A on the first frequency, and the second portable communications device 110B can transmit messages to the first portable communications device 110A over the second timeslot 220B on the second frequency.

Figure 3:
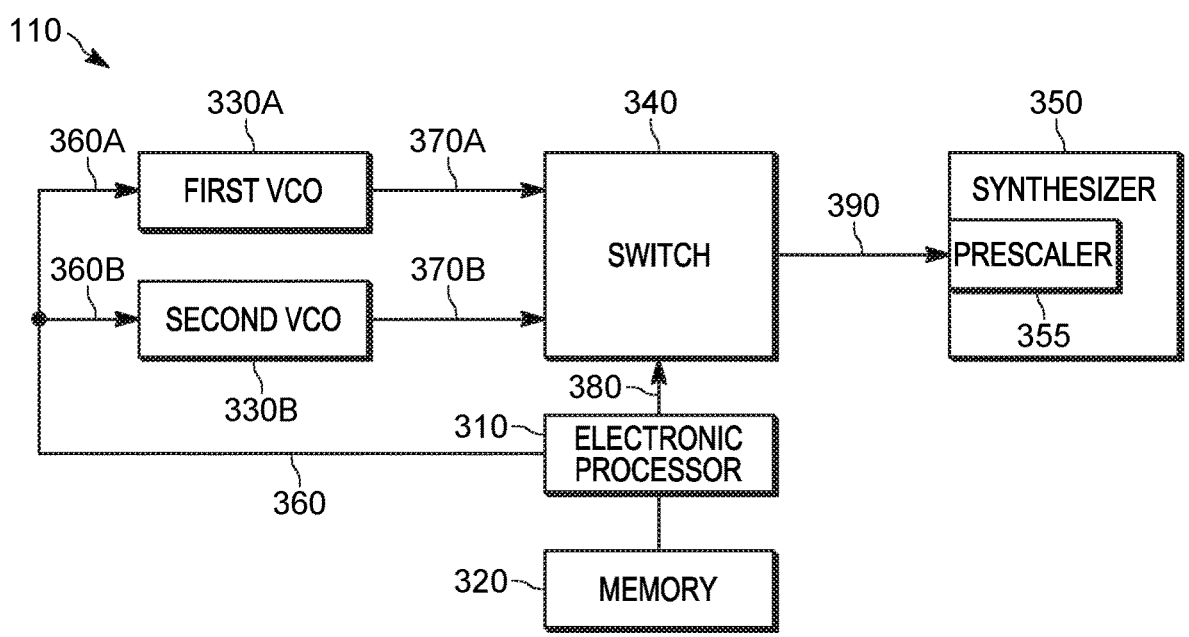
FIG. 3 is a block diagram of a portable communications device of communication system of FIG. 1 in accordance with some embodiments.

To implement the full duplex communication method, portable communications devices 110 use multiple synthesizers (for example, frequency generation units) such that the portable communications devices 110 can operate on multiple frequencies at the same time. However, use of multiple synthesizers adds to the cost and complexity of the portable communications device 110. FIG. 3 illustrates an example low-cost low-complexity portable communications device 110 that can perform full duplex operation in a TDMA radio system using only a single synthesizer.

FIG. 3 is a simplified block diagram of a portable communications device 110. In the example illustrated, the portable communications device 110 includes an electronic processor 310, a memory 320, a plurality of voltage controlled oscillators (VCOs) 330, a switch 340, and a synthesizer 350. FIG. 3 illustrates only one example embodiment of the portable communications device 110. The portable communications device 110 may include more or fewer components and may perform functions other than those explicitly described herein.

In some embodiments, the electronic processor 310 is implemented as a microprocessor with separate memory, such as the memory 320. In other embodiments, the electronic processor 310 may be implemented as a microcontroller (with memory 320 on the same chip). In other embodiments, the electronic processor 310 may be implemented using multiple processors. In addition, the electronic processor 310 may be implemented partially or entirely as, for example, a field-programmable gate array (FPGA), an application specific integrated circuit (ASIC), and the like and the memory 320 may not be needed or be modified accordingly. In the example illustrated, the memory 320 includes non-transitory, computer-readable memory that stores instructions that are received and executed by the electronic processor 310 to carry out the functionality of the portable communications device 110 described herein. The memory 320 may include, for example, a program storage area and a data storage area. The program storage area and the data storage area may include combinations of different types of memory, such as read-only memory and random-access memory.

The plurality of voltage controlled oscillators 330 includes, for example, a first voltage controlled oscillator 330A and a second voltage controlled oscillator 330B. The plurality of voltage controlled oscillators 330 may be singularly referred to as a voltage controlled oscillator 330. The voltage controlled oscillators 330 output a signal having a programmed frequency to the switch 340. The frequency of the voltage controlled oscillator 330 may be adjusted by adjusting the voltage input to the voltage controlled oscillator 330. The first voltage controlled oscillator 330A is programmed to output a signal at a first frequency, and the second voltage controlled oscillator 330B is programmed to output a signal at a second frequency. In some embodiments, the plurality of voltage controlled oscillators 330 are pre-programmed such that each voltage controlled oscillator 330 is programmed to a specific frequency. In other embodiments, the plurality of voltage controlled oscillators 330 may be programmed on the fly to different frequencies by adjusting the voltage provided to the voltage controlled oscillators 330. The voltage provided to the plurality of voltage controlled oscillators 330 may be adjusted by the electronic processor 310. The electronic processor 310 provides controls signals 360 to the plurality of voltage controlled oscillators 330 to turn on and turn off the plurality of voltage controlled oscillators 330. For example, the electronic processor 310 provides a first control signal 360A to the first voltage controlled oscillator 330A to turn on and turn off the first voltage controlled oscillator 330A, and provides a second control signal 360B to the second voltage controlled oscillator 330B to turn on and turn off the second voltage controlled oscillator 330B.

The switch 340 is, for example, a multiplexer including a plurality of input signals 370, a selection signal 380, and an output signal 390. In the example illustrated, the switch 340 receives a first input signal 370A from the first voltage controlled oscillator 330A, a second input signal 370B from the second voltage controlled oscillator 330B, and a selection signal 380 from the electronic processor 310. The switch 340 provides the output signal 390 to the synthesizer 350. The switch 340 is a pass-through circuit such that either the first input signal 370A or the second input signal 370B is passed through to the output signal 390 based on the selection signal 380 received from the electronic processor 310. That is, the electronic processor 310 controls the switch 340 to connect either the first voltage controlled oscillator 330A or the second voltage controlled oscillator 330B to the synthesizer 350 using the selection signal 380. The electronic processor 310 controls the switch 340 independently of the plurality of voltage controlled oscillators 330. At any one time, only one of the first voltage controlled oscillator 330A or the second voltage controlled oscillator 330B is connected to the synthesizer 350 using the switch 340.

The synthesizer 350 may include a plurality of multipliers and dividers to generate an output frequency based on the output signal 390 received from the switch 340. For example, the synthesizer 350 includes a prescaler 355 that divides the output signal 390 into the resulting output frequency for the synthesizer 350. The prescaler 355 is coupled to switch 340. The output frequency is used by a modulator-demodulator of the portable communications device 110 to modulate a signal for transmission or demodulate a received signal. The synthesizer 350 generates a first frequency (that is, over a first 12.5 KHz bandwidth) when the synthesizer 350 is connected to the first voltage controlled oscillator 330A, and generates a second frequency (that is, over a second 12.5 KHz bandwidth) when the synthesizer 350 is connected to the second voltage controlled oscillator 330B.

FIG. 4 illustrates an example direct mode full duplex communication between the first portable communications device 110A and the second portable communications device 110B. The first portable communications device 110A and the second portable communications device 110B communicate over a first frequency F1 and a second frequency F2. The first timeslot 220A in the first frequency F1 and the second timeslot 220B in the second frequency F2 is used for the full duplex communication between the first portable communications device 110A and the second portable communications device 110B. In the example illustrated, the first frequency F1 and the second frequency F2 are within the ultra-high frequency band. However, the first frequency F1 and second frequency F2 may be selected such that the first frequency F1 and the second frequency F2 are not adjacent or overlapping to prevent any interference between the transmitting and the receiving components of the portable communications device 110.

In the example illustrated in FIG. 4, the first portable communications device 110A is transmitting in the first timeslot 220A on the first frequency F1 while the second portable communications device 110B is receiving in the first timeslot 220A on the first frequency F1. The second portable communications device 110B is transmitting in the second timeslot 220B on the second frequency F2 while the first portable communications device 110A is receiving in the second timeslot 220B on the second frequency F2. Additionally, the first frequency F1 and the second frequency F2 are within the ultra-high frequency band. For example, the first frequency is 527 MHz and the second frequency is 403 MHz.

Figure 5:
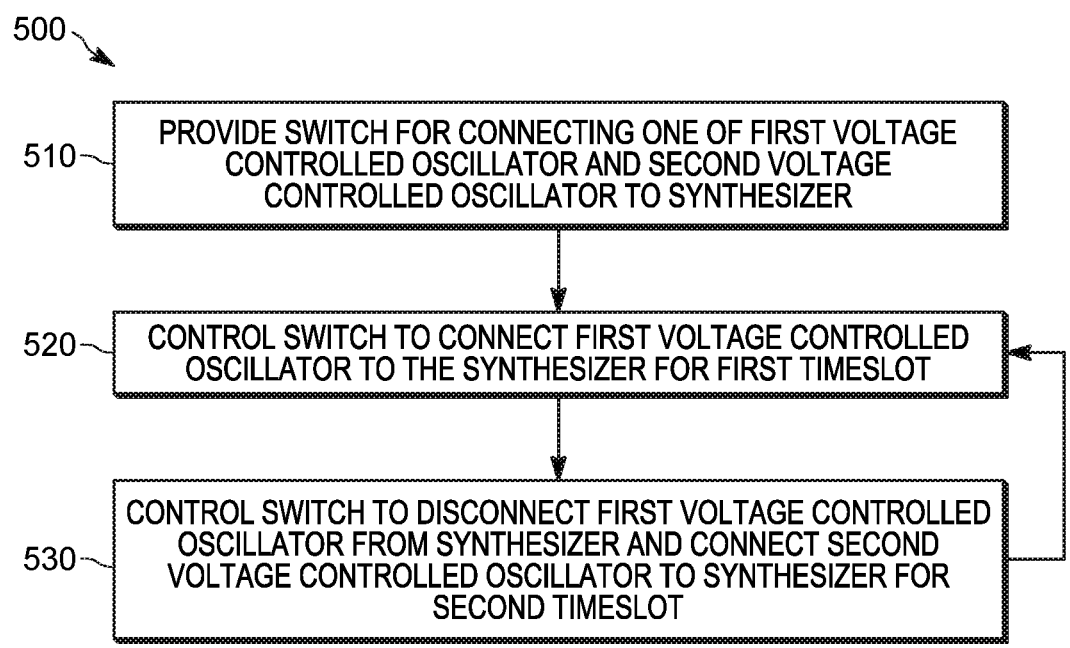
FIG. 5 is a flowchart of a method for full duplex operation of the portable communications device FIG. 3 in a time-division multiple access radio system in accordance with some embodiments.

FIG. 5 is a flowchart of an example method 500 for full duplex operation of a portable communications device 110 (for example, the first portable communications device 110A) in a TDMA radio system. In the example illustrated, the method 500 includes providing the switch 340 for connecting one of the first voltage controlled oscillator 330A and the second voltage controlled oscillator 330B to the synthesizer 350 (at block 510). As shown in FIG. 3, the switch 340 is provided between the plurality of voltage controlled oscillators 330 and the synthesizer 350. The switch 340 receives the selection signal 380 from the electronic processor 310, and based on the selection signal 380 connects either the first voltage controlled oscillator 330A or the second voltage controlled oscillator 330B to the synthesizer 350.

The method 500 includes controlling, using the electronic processor 310 coupled to the switch 340, the switch 340 to connect the first voltage controlled oscillator 330A to the synthesizer 350 for the first timeslot 220A (at block 520). For the first timeslot 220A, the portable communications device 110 is operating in the first frequency F1. The electronic processor 310 turns on the first voltage controlled oscillator 330A corresponding to the first frequency F1. The electronic processor 310 waits until the output of the first voltage controlled oscillator 330A is stable to control the switch 340. Once the first voltage controlled oscillator 330A is stable, the electronic processor 310 controls the switch 340 using the selection signal 380 to connect the first voltage controlled oscillator 330A to the synthesizer 350. The synthesizer 350 provides an output signal in the first frequency F1 when connected to the first voltage controlled oscillator 330A. The output signal in the first frequency F1 is used by a modulator of the portable communications device 110 to modulate a signal for transmission in the first timeslot 220A when the portable communications device 110 is transmitting in the first frequency F1. The output signal in the first frequency F1 is used by a demodulator of the portable communications device 110 to demodulate a received signal in the first timeslot 220A when the portable communications device 110 is receiving in the first frequency F1.

The method 500 also includes controlling, using the electronic processor 310, the switch 340 to disconnect the first voltage controlled oscillator 330A from the synthesizer 350 and connect the second voltage controlled oscillator 330B to the synthesizer 350 for the second timeslot 220B (at block 530). The second timeslot 220B is immediately adjacent to the first timeslot 220A. At the end of the first timeslot 220A, the portable communications device 110 transitions to the second frequency F2 to receive in the second timeslot 220B. To transition from the first frequency F1 to the second frequency F2, the electronic processor 310 first turns on the second voltage controlled oscillator 330B. The electronic processor 310 waits for the second voltage controlled oscillator 330B to become stable. Once the output of the second voltage controlled oscillator 330B is stable, the electronic processor 310 controls the switch 340 using the selection signal 380 to connect the second voltage controlled oscillator 330B to the synthesizer 350. The synthesizer 350 provides an output signal in the second frequency F2 when connected to the second voltage controlled oscillator 330B. The output signal in the second frequency F2 is used by a demodulator of the portable communications device 110 to demodulate a received signal in the second timeslot 220B when the portable communications device 110 is receiving in the second frequency F2. The output signal in the second frequency F2 is used by a modulator of the portable communications device 110 to modulate a signal for transmission in the second timeslot 220B when the portable communications device 110 is transmitting in the second frequency F2. The method 500 repeats for each transition from first frequency F1 to second frequency F2 and from second frequency F2 to first frequency F1 to switch the voltage controlled oscillator 330 connected to the synthesizer 350.

Figure 6A:
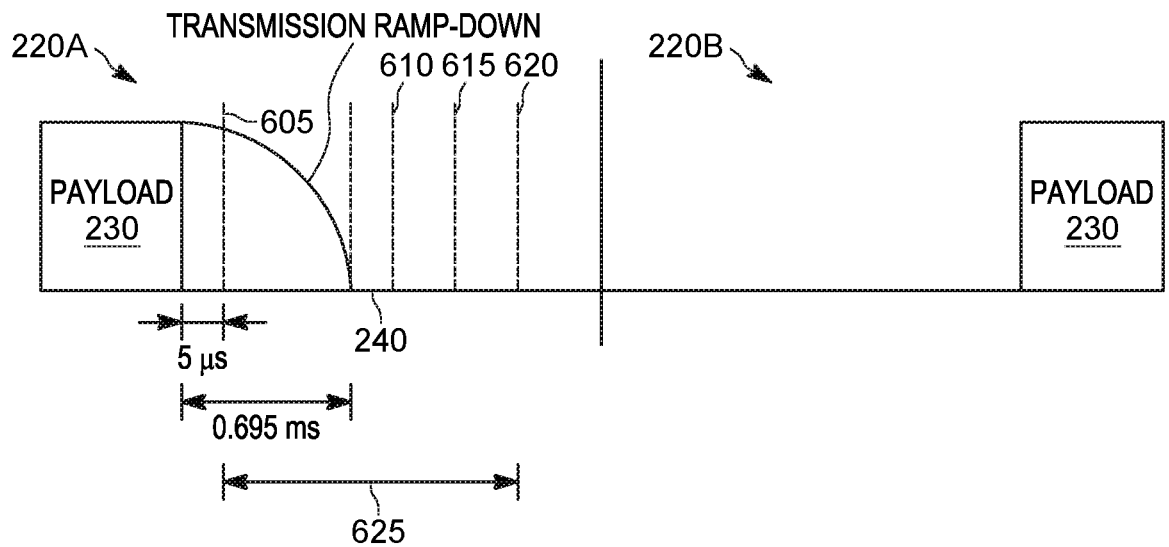
FIGS. 6A and 6B illustrate direct mode full duplex communication of FIG. 4 from point of view of a portable communications device of FIG. 1 in accordance with some embodiments.
Figure 6B:
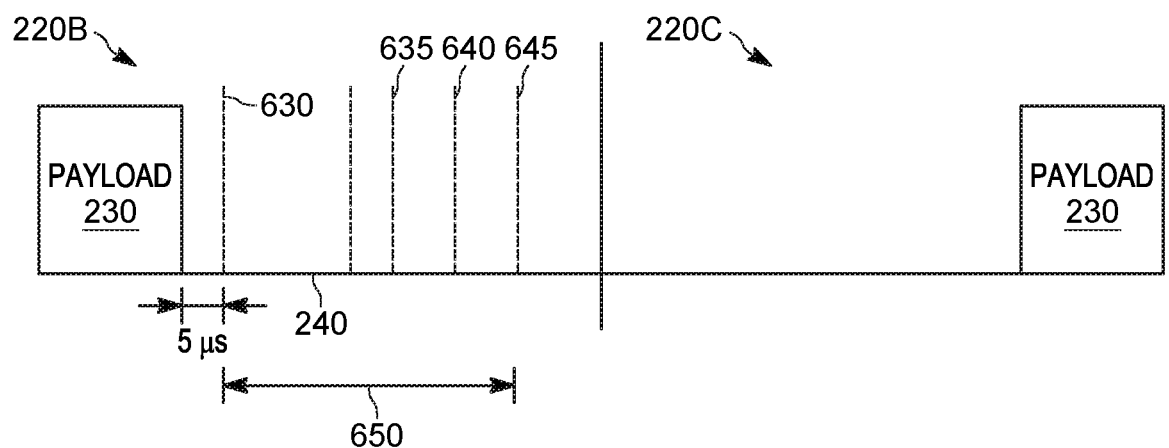

The method 500 is further explained below with respect to FIGS. 6A and 6B. FIGS. 6A and 6B illustrate the direct mode full duplex communication illustrated in FIG. 4 from the point of view of the first portable communications device 110A. In the example illustrated in FIGS. 6A and 6B, the first portable communications device 110A is transmitting for the first timeslot 220A on the first frequency F1 and is receiving for the second timeslot 220B on the second frequency F2. The first portable communications device 110A continues to transmit in the first timeslot 220A and receive in the second timeslot 220B for the duration of the call.

Referring to FIG. 6A, the switch 340 connects first voltage controlled oscillator 330A to the synthesizer 350 for the first timeslot 220A. The first portable communications device 110A is therefore operating on the first frequency F1 corresponding to the first voltage controlled oscillator 330A during the first timeslot 220A. After the payload 230 of the first timeslot 220A, the first portable communications device 110A begins transition to the second frequency F2 for the second timeslot 220B. The electronic processor 310 turns on the second voltage controlled oscillator 330B at 605 after the payload 230 of the first timeslot 220A. The electronic processor 310 waits for the output of the second voltage controlled oscillator 330B to become stable before controlling the switch 340 to disconnect the first voltage controlled oscillator 330A from the synthesizer 350 and to connect the second voltage controlled oscillator 330B to the synthesizer 350 for the second timeslot 220B.

To ensure that the second voltage controlled oscillator 330B is stable for the second timeslot 220B, the second voltage controlled oscillator 330B is turned on before the end of the first timeslot 220A. For example, the second voltage controlled oscillator 330B is turned on at the end of the payload 230 of the first timeslot 220A and before end of the first timeslot 220A. In one example, the electronic processor 310 turns on the second voltage controlled oscillator 330B about 5 microseconds (µs) after the end of the payload 230. The transmission may take about 0.695 ms after the end of the payload 230 of the first timeslot 220A to ramp down and the second voltage controlled oscillator 330B takes about 0.5 ms to provide a stable output. Additionally, the electronic processor 310 controls the switch 340 to disconnect the first voltage controlled oscillator 330A and connect the second voltage controlled oscillator 330B to the synthesizer 350 at 610 before the end of the first timeslot 220A, and after stabilization of the second voltage controlled oscillator 330B. The synthesizer 350 starts generating the second Frequency F2 at 615 when the second voltage controlled oscillator 330B is connected to the synthesizer 350 using the switch 340. Therefore, the stabilization time of the second voltage controlled oscillator 330B is absorbed within the guard interval 240 of the first timeslot 220A and the first portable communications device 110A is set to the second frequency F2 before the start of the second timeslot 220B.

The electronic processor 310 turns off the first voltage controlled oscillator 330A at 620 after the second voltage controlled oscillator 330B is connected to the synthesizer 350 and before the end of the first timeslot 220A. Turning off inactive voltage controlled oscillators 330 provides battery savings for the portable communications devices 110.

Both the first voltage controlled oscillator 330A and the second voltage controlled oscillator 330B are turned on at the same time for a time period 625 of the guard interval 240 between the payload 230 of the first timeslot 220A and the end of the first timeslot 220A. The switch 340 provides isolation between the first voltage controlled oscillator 330A and the synthesizer 350 when the first voltage controlled oscillator 330A is disconnected from the synthesizer 350. This prevents any interference caused by two voltage controlled oscillators 330 being turned on at the same time. Specifically, the switch 340 provides isolation between an unconnected voltage controlled oscillator 330 and the synthesizer 350 to sufficiently attenuate the signal from the unconnected voltage controlled oscillator 330 at the synthesizer 350. For example, the switch 340 may provide an isolation of between 25 to 50 decibels (dB). In some embodiments, the switch 340 may provide up to 80 dB of isolation between an unconnected voltage controlled oscillator 330 and the synthesizer 350.

The blocks 520 and 530 are repeated for the next instance of the timeslots 220. Referring to FIG. 6B, at the end of the second timeslot 220B, the portable communications device 110 transitions to the first frequency F1 to transmit in the third timeslot 220C. One of ordinary skill in the art appreciates the third timeslot 220C refers to a next instance of the first timeslot 220A of the first frequency F1 in a two timeslots 220 communication system 100. To transition from the second frequency F2 to the first frequency F1, the electronic processor 310 first turns on the first voltage controlled oscillator 330A at 630. The electronic processor 310 waits for the first voltage controlled oscillator 330A to become stable. Once the output of the first voltage controlled oscillator 330A is stable, the electronic processor 310 controls the switch 340 using the selection signal 380 to disconnect the second voltage controlled oscillator 330B from the synthesizer 350 and connect the first voltage controlled oscillator 330A to the synthesizer 350 for the third timeslot 220C. The third timeslot 220C is immediately adjacent to the second timeslot 220B. The synthesizer 350 provides an output signal in the first frequency F1 when connected to the first voltage controlled oscillator 330A. The output signal in the first frequency F1 is used by a modulator of the first portable communications device 110A to modulate a signal for transmission in the third timeslot 220C.

To ensure that the first voltage controlled oscillator 330A is stable for the third timeslot 220C, the first voltage controlled oscillator 330A is turned on before the end of the second timeslot 220B. For example, the first voltage controlled oscillator 330A is turned on at the end of the payload 230 of the second timeslot 220B and before end of the second timeslot 220B. The electronic processor 310 may turn on the first voltage controlled oscillator 330A about 5 microseconds (μs) after the end of the payload 230. The first voltage controlled oscillator 330A takes about 0.5 ms to provide a stable output. Additionally, the electronic processor 310 controls the switch 340 to disconnect the second voltage controlled oscillator 330B and connect the first voltage controlled oscillator 330A to the synthesizer 350 at 635 before the end of the second timeslot 220B, and after stabilization of the first voltage controlled oscillator 330A. The synthesizer 350 starts generating the first Frequency F1 at 640 when the first voltage controlled oscillator 330A is connected to the synthesizer 350 using the switch 340. Therefore, the stabilization time of the first voltage controlled oscillator 330A is absorbed within the guard interval 240 of the second timeslot 220B and the first portable communications device 110A is set to the first frequency F1 before the start of the third timeslot 220C.

The electronic processor 310 turns off the second voltage controlled oscillator 330B at 645 after the first voltage controlled oscillator 330A is connected to the synthesizer 350 and before the end of the second timeslot 220B.

Both the first voltage controlled oscillator 330A and the second voltage controlled oscillator 330B are turned on at the same time for a time period 650 of the guard interval 240 between the payload 230 of the second timeslot 220B and the payload 230 of the third timeslot 220C. As discussed above, the switch 340 provides isolation between the second voltage controlled oscillator 330B and the synthesizer 350 when the second voltage controlled oscillator 330B is disconnected from the synthesizer 350. This prevents any interference caused by two voltage controlled oscillators 330 being turned on at the same time.

The portable communications device 110 may therefore be operated in full duplex operation over the complete range of allotted frequencies. For example, multiple voltage controlled oscillators 330 may be used with the switch 340 and the synthesizer 350 to vary the operating frequency of the portable communications device 110 for each timeslot 220. Alternatively, two or more voltage controlled oscillators 330 may be adjusted to provide different frequencies by adjusting the voltage input of the voltage controlled oscillators.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communications device for full duplex operation in a time division multiple access (TDMA) radio system, the portable communications device comprising:
   a first voltage controlled oscillator;
   a second voltage controlled oscillator;
   a synthesizer configured to generate a first frequency when connected to the first voltage controlled oscillator and generate a second frequency when connected to the second voltage controlled oscillator;
   a switch coupled to the first voltage controlled oscillator, the second voltage controlled oscillator, and the synthesizer, the switch configured to connect one of the first voltage controlled oscillator and the second voltage controlled oscillator to the synthesizer; and
   an electronic processor coupled to the first voltage controlled oscillator, the second voltage controlled oscillator, and the switch, the electronic processor configured to:
      control the switch to connect the first voltage controlled oscillator to the synthesizer for a first timeslot,
      control the switch to disconnect the first voltage controlled oscillator from the synthesizer and connect the second voltage controlled oscillator to the synthesizer for a second timeslot, the second timeslot being immediately adjacent to the first timeslot
      turn on the second voltage controlled oscillator at the end of a payload of the first timeslot and before the end of the first timeslot, and
      control the switch to disconnect the first voltage controlled oscillator from the synthesizer and connect the second voltage controlled oscillator to the synthesizer before the end of the first timeslot and after stabilization of the second voltage controlled oscillator.

2. The portable communications device of claim 1, wherein the electronic processor is further configured to:
   turn off the first voltage controlled oscillator after the second voltage controlled oscillator is connected to the synthesizer and before end of the first timeslot.

3. The portable communications device of claim 2, wherein the electronic processor is further configured to:
   control the switch to disconnect the second voltage controlled oscillator from the synthesizer and connect the first voltage controlled oscillator to the synthesizer for a third timeslot, the third timeslot being immediately adjacent to the second timeslot.

4. The portable communications device of claim 3, wherein the electronic processor is further configured to
   turn on the first voltage controlled oscillator at the end of a payload of the second timeslot and before end of the second timeslot, and
   control the switch to disconnect the second voltage controlled oscillator from the synthesizer and connect the first voltage controlled oscillator to the synthesizer before end of the second timeslot and after stabilization of the first voltage controlled oscillator.

5. The portable communications device of claim 4, wherein both the first voltage controlled oscillator and the second voltage controlled oscillator are turned on for a time period between the payload of the first timeslot and the payload of the second timeslot.

6. The portable communications device of claim 1, wherein the switch provides isolation between the first voltage controlled oscillator and the synthesizer when the first voltage controlled oscillator is disconnected from the synthesizer and wherein the switch provides isolation between the second voltage controlled oscillator and the synthesizer when the second voltage controlled oscillator is disconnected from the synthesizer.

7. The portable communications device of claim 1, wherein the first timeslot and the second timeslot are each 30 milliseconds having a payload of 27.5 milliseconds and 1.25 milliseconds of guard time on each side of the payload.

8. The portable communications device of claim 1, wherein the first frequency and the second frequency are within an ultra-high frequency band.

9. The portable communications device of claim 1, wherein the synthesizer includes a prescaler and wherein the switch is coupled to the prescaler.

10. A method for full duplex operation of a portable communications device in a time division multiple access (TDMA) radio system, the method comprising:
    providing a switch for connecting one of a first voltage controlled oscillator and a second voltage controlled oscillator to a synthesizer, wherein the synthesizer generates a first frequency when connected to the first voltage controlled oscillator and generates a second frequency when connected to the second voltage controlled oscillator;
    controlling, using an electronic processor coupled to the switch, the switch to connect the first voltage controlled oscillator to the synthesizer for a first timeslot,
    controlling, using the electronic processor, the switch to disconnect the first voltage controlled oscillator from the synthesizer and connect the second voltage controlled oscillator to the synthesizer for a second timeslot, the second timeslot being immediately adjacent to the first timeslot
    turning on the second voltage controlled oscillator at the end of a payload of the first timeslot and before the end of the first timeslot, and
    controlling the switch to disconnect the first voltage controlled oscillator from the synthesizer and connect the second voltage controlled oscillator to the synthesizer before the end of the first timeslot and after stabilization of the second voltage controlled oscillator.

11. The method of claim 10, further comprising:
turning off the first voltage controlled oscillator after the second voltage controlled oscillator is connected to the synthesizer and before end of the first timeslot.

12. The method of claim 11, further comprising:
controlling the switch to disconnect the second voltage controlled oscillator from the synthesizer and connect the first voltage controlled oscillator to the synthesizer for a third timeslot, the third timeslot being immediately adjacent to the second timeslot.

13. The method of claim 12, further comprising:
turning on the first voltage controlled oscillator at the end of a payload of the second timeslot and before end of the second timeslot, and
controlling the switch to disconnect the second voltage controlled oscillator from the synthesizer and connect the first voltage controlled oscillator to the synthesizer before end of the second timeslot and after stabilization of the first voltage controlled oscillator.

14. The method of claim 13, wherein both the first voltage controlled oscillator and the second voltage controlled oscillator are turned on for a time period between the payload of the first timeslot and the payload of the second timeslot.

15. The method of claim 10, wherein the switch provides isolation between the first voltage controlled oscillator and the synthesizer when the first voltage controlled oscillator is disconnected from the synthesizer and wherein the switch provides isolation between the second voltage controlled oscillator and the synthesizer when the second voltage controlled oscillator is disconnected from the synthesizer.

16. The method of claim 10, wherein the first timeslot and the second timeslot are each 30 milliseconds having a payload of 27.5 milliseconds and 1.25 milliseconds of guard time on each side of the payload.

17. The method of claim 10, wherein the first frequency and the second frequency are within an ultra-high frequency band.

18. The method of claim 10, wherein the synthesizer includes a prescaler and wherein the switch is coupled to the prescaler.

* * * * *